US012518803B2

(12) United States Patent
Lu et al.

(10) Patent No.: US 12,518,803 B2
(45) Date of Patent: Jan. 6, 2026

(54) DATA SENSE AMPLIFIER CIRCUIT WITH A HYBRID ARCHITECTURE

(71) Applicant: Micron Technology, Inc., Boise, ID (US)

(72) Inventors: Yang Lu, Boise, ID (US); Kang-Yong Kim, Boise, ID (US); Wonjun Choi, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 131 days.

(21) Appl. No.: 18/627,960

(22) Filed: Apr. 5, 2024

(65) Prior Publication Data
US 2024/0339152 A1 Oct. 10, 2024

Related U.S. Application Data

(60) Provisional application No. 63/494,697, filed on Apr. 6, 2023.

(51) Int. Cl.
G11C 7/06 (2006.01)

(52) U.S. Cl.
CPC ............ G11C 7/06 (2013.01); G11C 2207/06 (2013.01)

(58) Field of Classification Search
CPC ................................ G11C 7/06; G11C 2207/06
See application file for complete search history.

(56) References Cited

U.S. PATENT DOCUMENTS

| 2004/0022093 | A1* | 2/2004 | Lee | G11C 29/808 365/200 |
| 2020/0251158 | A1* | 8/2020 | Shore | G11C 11/408 |
| 2020/0279589 | A1* | 9/2020 | Onuki | G11C 11/4091 |
| 2024/0338126 | A1* | 10/2024 | Kim | G06F 3/0653 |

* cited by examiner

Primary Examiner — Jay W. Radke
(74) Attorney, Agent, or Firm — Colby Nipper PLLC

(57) ABSTRACT

Apparatuses and techniques for implementing a data sense amplifier circuit with a hybrid architecture. With the hybrid architecture, the data sense amplifier circuit includes a first set of amplifiers that are shared by multiple banks and includes a second set of amplifiers with multiple subsets dedicated to different banks. The bank-shared amplifiers support memory operations (e.g., a read operation) across multiple banks. Each amplifier within the first set of amplifiers is coupled to at least two banks. The bank-specific amplifiers support usage-based disturbance mitigation for a corresponding bank. Each amplifier within the second set of amplifiers is coupled to one of the multiple banks. The bank-shared amplifiers enable the data sense amplifier circuit to have a smaller footprint while the bank-specific amplifiers enable the data sense amplifier circuit to support usage-based disturbance mitigation and avoid conflicts associated with some sequences of commands.

20 Claims, 9 Drawing Sheets

DATA SENSE AMPLIFIER CIRCUIT WITH A HYBRID ARCHITECTURE

CROSS-REFERENCE TO RELATED APPLICATION(S)

This application claims the benefit of U.S. Provisional Patent Application Ser. No. 63/494,697 filed on Apr. 6, 2023, the disclosure of which is incorporated by reference herein in its entirety.

BACKGROUND

Computers, smartphones, and other electronic devices rely on processors and memories. A processor executes code based on data to run applications and provide features to a user. The processor obtains the code and the data from a memory. The memory in an electronic device can include volatile memory (e.g., random-access memory (RAM)) and non-volatile memory (e.g., flash memory). Like the capabilities of a processor, the capabilities of a memory can impact the performance of an electronic device. This performance impact can increase as processors are developed that execute code faster and as applications operate on increasingly larger data sets that require ever-larger memories.

BRIEF DESCRIPTION OF THE DRAWINGS

Apparatuses of and techniques for implementing aspects of a data sense amplifier circuit with a hybrid architecture are described with reference to the following drawings. The same numbers are used throughout the drawings to reference like features and components.

DETAILED DESCRIPTION

Overview

Figure 1:
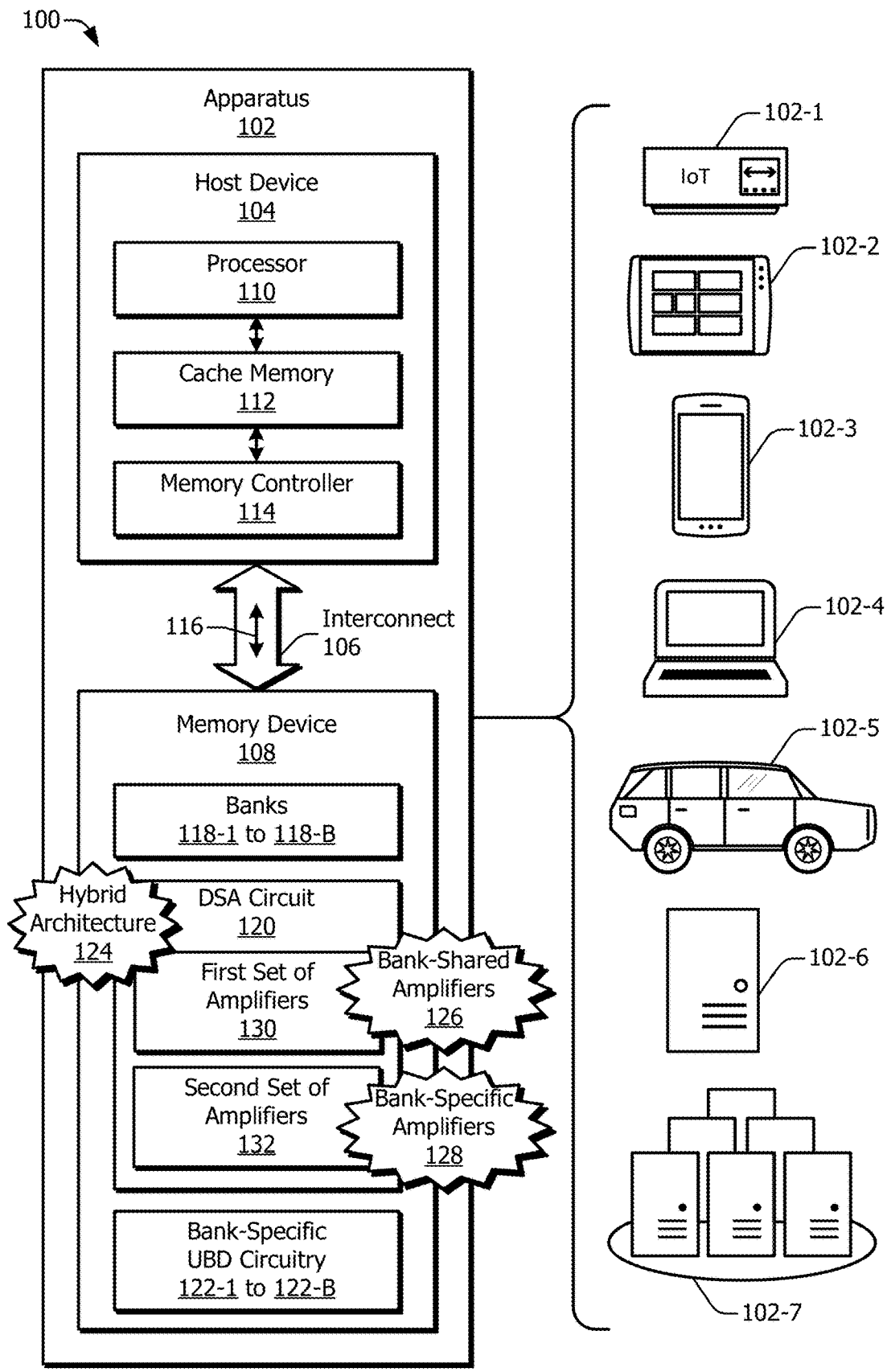
FIG. 1 illustrates example apparatuses that can implement aspects of a data sense amplifier circuit with a hybrid architecture.

Processors and memory work in tandem to provide features to users of computers and other electronic devices. As processors and memory operate more quickly together in a complementary manner, an electronic device can provide enhanced features, such as high-resolution graphics and artificial intelligence (AI) analysis. Some applications, such as those for financial services, medical devices, and advanced driver assistance systems (ADAS), can also demand more-reliable memories. These applications use increasingly reliable memories to limit errors in financial transactions, medical decisions, and object identification. However, in some implementations, more-reliable memories can sacrifice bit densities, power efficiency, and simplicity.

To meet the demands for physically smaller memories, memory devices can be designed with higher chip densities. Increasing chip density, however, can increase the electromagnetic coupling (e.g., capacitive coupling) between adjacent or proximate rows of memory cells due, at least in part, to a shrinking distance between these rows. With this undesired coupling, activation (or charging) of a first row of memory cells can sometimes negatively impact a second nearby row of memory cells. In particular, activation of the first row can generate interference, or crosstalk, that causes the second row to experience a voltage fluctuation. In some instances, this voltage fluctuation can cause a state (or value) of a memory cell in the second row to be incorrectly determined by a sense amplifier. Consider an example in which a state of a memory cell in the second row is a "1". In this example, the voltage fluctuation can cause a sense amplifier to incorrectly determine the state of the memory cell to be a "0" instead of a "1". Left unchecked, this interference can lead to memory errors or data loss within the memory device.

In some circumstances, a particular row of memory cells is activated repeatedly in an unintentional or intentional (sometimes malicious) manner. Consider, for instance, that memory cells in an $R^{th}$ row are subjected to repeated activation, which causes one or more memory cells in an adjacent row (e.g., within an R+1 row, an R+2 row, an R−1 row, and/or an R−2 row) to change states. This effect is referred to as usage-based disturbance. The occurrence of usage-based disturbance can lead to the corruption or changing of contents within the affected row of memory.

Some memory devices can detect usage-based disturbance and mitigate its effects. In some designs, a memory device passes data through a data sense amplifier circuit as part of an operation associated with usage-based disturbance mitigation. A memory controller, however, may be unaware of the additional operations that the memory device performs to mitigate usage-based disturbance. Consequently, the memory controller may transmit a sequence of commands that cause a usage conflict with regard to the data sense amplifier circuit. In an example situation, the memory controller transmits a command that causes the memory device to utilize the data sense amplifier circuit before the memory device finishes utilizing the data sense amplifier circuit for usage-based disturbance mitigation based on a previous command. Two sequential commands that can result in a potential conflict include some combinations of a read (RD) command, a read with auto-precharge (RDA) command, a write with auto-precharge (WRA) command, a precharge all banks (PREab) command, a precharge same bank (PREsb) command, or a precharge per bank (PREpb) command. Other commands are also possible, including commands associated with a refresh. In general, these commands can be associated with a same bank or different banks.

To address this and other issues regarding usage-based disturbance, this document describes a data sense amplifier circuit with a hybrid architecture. With the hybrid architecture, the data sense amplifier circuit includes a first set of amplifiers that are shared by multiple banks, and includes a second set of amplifiers with multiple subsets dedicated to different banks. The bank-shared amplifiers support memory operations (e.g., a read operation) across multiple banks. Each amplifier within the first set of amplifiers is coupled to at least two of the multiple banks. The bank-specific amplifiers support usage-based disturbance mitigation for a corresponding bank. Each amplifier within the second set of amplifiers is coupled to one of the multiple banks. The bank-shared amplifiers enable the data sense amplifier circuit to have a smaller footprint while the bank-specific amplifiers enable the data sense amplifier circuit to support usage-based disturbance mitigation and avoid conflicts associated with some sequences of commands.

Example Operating Environments

FIG. 1 illustrates, at 100 generally, an example operating environment including an apparatus 102 that can implement a hybrid data sense amplifier architecture that supports usage-based disturbance mitigation. The apparatus 102 can include various types of electronic devices, including an internet-of-things (IoT) device 102-1, tablet device 102-2, smartphone 102-3, notebook computer 102-4, passenger vehicle 102-5, server computer 102-6, and server cluster 102-7 that may be part of cloud computing infrastructure, a data center, or a portion thereof (e.g., a printed circuit board (PCB)). Other examples of the apparatus 102 include a wearable device (e.g., a smartwatch or intelligent glasses), entertainment device (e.g., a set-top box, video dongle, smart television, a gaming device), desktop computer, motherboard, server blade, consumer appliance, vehicle, drone, industrial equipment, security device, sensor, or the electronic components thereof. Each type of apparatus can include one or more components to provide computing functionalities or features.

In example implementations, the apparatus 102 can include at least one host device 104, at least one interconnect 106, and at least one memory device 108. The host device 104 can include at least one processor 110, at least one cache memory 112, and a memory controller 114. The memory device 108, which can also be realized with a memory module, can include, for example, a dynamic random-access memory (DRAM) die or module (e.g., Low-Power Double Data Rate synchronous DRAM (LPDDR SDRAM)). The DRAM die or module can include a three-dimensional (3D) stacked DRAM device, which may be a high-bandwidth memory (HBM) device or a hybrid memory cube (HMC) device. The memory device 108 can operate as a main memory for the apparatus 102. Although not illustrated, the apparatus 102 can also include storage memory. The storage memory can include, for example, a storage-class memory device (e.g., a flash memory, hard disk drive, solid-state drive, phase-change memory (PCM), or memory employing 3D XPoint™).

The processor 110 is operatively coupled to the cache memory 112, which is operatively coupled to the memory controller 114. The processor 110 is also coupled, directly or indirectly, to the memory controller 114. The host device 104 may include other components to form, for instance, a system-on-a-chip (SoC). The processor 110 may include a general-purpose processor, central processing unit, graphics processing unit (GPU), neural network engine or accelerator, application-specific integrated circuit (ASIC), field-programmable gate array (FPGA) integrated circuit (IC), or communications processor (e.g., a modem or baseband processor).

In operation, the memory controller 114 can provide a high-level or logical interface between the processor 110 and at least one memory (e.g., an external memory). The memory controller 114 may be realized with any of a variety of suitable memory controllers (e.g., a double-data-rate (DDR) memory controller that can process requests for data stored on the memory device 108). Although not shown, the host device 104 may include a physical interface (PHY) that transfers data between the memory controller 114 and the memory device 108 through the interconnect 106. For example, the physical interface may be an interface that is compatible with a DDR PHY Interface (DFI) Group interface protocol. The memory controller 114 can, for example, receive memory requests from the processor 110 and provide the memory requests to external memory with appropriate formatting, timing, and reordering. The memory controller 114 can also forward to the processor 110 responses to the memory requests received from external memory.

The host device 104 is operatively coupled, via the interconnect 106, to the memory device 108. In some examples, the memory device 108 is connected to the host device 104 via the interconnect 106 with an intervening buffer or cache. The memory device 108 may operatively couple to storage memory (not shown). The host device 104 can also be coupled, directly or indirectly via the interconnect 106, to the memory device 108 and the storage memory. The interconnect 106 and other interconnects (not illustrated in FIG. 1) can transfer data between two or more components of the apparatus 102. Examples of the interconnect 106 include a bus (e.g., a unidirectional or bidirectional bus), switching fabric, or one or more wires that carry voltage or current signals. The interconnect 106 can propagate one or more communications 116 between the host device 104 and the memory device 108. For example, the host device 104 may transmit a memory request to the memory device 108 over the interconnect 106. Also, the memory device 108 may transmit a corresponding memory response to the host device 104 over the interconnect 106.

The illustrated components of the apparatus 102 represent an example architecture with a hierarchical memory system. A hierarchical memory system may include memories at different levels, with each level having memory with a different speed or capacity. As illustrated, the cache memory 112 logically couples the processor 110 to the memory device 108. In the illustrated implementation, the cache memory 112 is at a higher level than the memory device 108. A storage memory, in turn, can be at a lower level than the main memory (e.g., the memory device 108). Memory at lower hierarchical levels may have a decreased speed but increased capacity relative to memory at higher hierarchical levels.

The apparatus 102 can be implemented in various manners with more, fewer, or different components. For example, the host device 104 may include multiple cache memories (e.g., including multiple levels of cache memory) or no cache memory. In other implementations, the host device 104 may omit the processor 110 or the memory controller 114. A memory (e.g., the memory device 108) may have an "internal" or "local" cache memory. As another example, the apparatus 102 may include cache memory between the interconnect 106 and the memory device 108. Computer engineers can also include any of the illustrated components in distributed or shared memory systems.

Computer engineers may implement the host device 104 and the various memories in multiple manners. In some cases, the host device 104 and the memory device 108 can be disposed on, or physically supported by, a printed circuit board (e.g., a rigid or flexible motherboard). The host device 104 and the memory device 108 may additionally be integrated together on an integrated circuit or fabricated on separate integrated circuits and packaged together. The memory device 108 may also be coupled to multiple host devices 104 via one or more interconnects 106 and may respond to memory requests from two or more host devices 104. Each host device 104 may include a respective memory controller 114, or the multiple host devices 104 may share a memory controller 114. This document describes with reference to FIG. 1 an example computing system architecture having at least one host device 104 coupled to a memory device 108.

Two or more memory components (e.g., modules, dies, banks, or bank groups) can share the electrical paths or couplings of the interconnect 106. The interconnect 106 can include at least one command-and-address bus (CA bus) and at least one data bus (DQ bus). The command-and-address bus can transmit addresses and commands from the memory controller 114 of the host device 104 to the memory device 108, which may exclude propagation of data. The data bus can propagate data between the memory controller 114 and the memory device 108. The memory device 108 may also be implemented as any suitable memory including, but not limited to, DRAM, SDRAM, three-dimensional (3D) stacked DRAM, DDR memory, or LPDDR memory (e.g., LPDDR DRAM or LPDDR SDRAM).

The memory device 108 can form at least part of the main memory of the apparatus 102. The memory device 108 may, however, form at least part of a cache memory, a storage memory, or a system-on-chip of the apparatus 102. The memory device 108 includes banks 118-1 to 118-B and a data sense amplifier circuit 120 (DSA circuit 120), which is coupled to the banks 118-1 to 118-B. The variable B represents a positive integer. The memory device 108 also includes bank-specific usage-based disturbance circuitry 122-1 to 122-B (bank-specific UBD circuitry 122-1 to 122-B).

The data sense amplifier circuit 120 supports memory operations that are performed with respect to the banks 118-1 to 118-B. For example, data can pass through the data sense amplifier circuit 120 during memory operations that involve one or more of the banks 118-1 to 118-B. The data sense amplifier circuit 120 can also provide signal amplification across input/output lines associated with the banks 118-1 to 118-B.

Each bank-specific usage-based disturbance circuitry 122-1 to 122-B monitors and mitigates usage-based disturbance for a corresponding bank 118-1 to 118-B. The bank-specific usage-based disturbance circuitry 122-1 to 122-B can be implemented using software, firmware, hardware, fixed logic circuitry, or combinations thereof. In an example implementation, each bank-specific usage-based disturbance circuitry 122-1 to 122-B includes at least one counter circuit for monitoring for usage-based disturbance, at least one comparator circuit for detecting a condition associated with usage-based disturbance, at least one queue (e.g., a plurality of registers) for mitigating usage-based disturbance, at least one error-correction-code (ECC) circuit for detecting and/or correcting bit errors, or some combination thereof.

The data sense amplifier circuit 120 has a hybrid architecture 124 that includes some amplifiers that are shared by multiple banks 118 (e.g., bank-shared amplifiers 126) and other amplifiers that are specific to one of the banks 118 (e.g., bank-specific amplifiers 128). The bank-shared amplifiers 126 are represented by a first set of amplifiers 130 (or a first set of sense amplifiers). Sense amplifiers (or amplifiers) within the first set of amplifiers 130 are coupled between the multiple banks 118-1 to 118-B and the interconnect 106, as further described with respect to FIG. 4. More specifically, each sense amplifier within the first set of amplifiers 130 is coupled to at least two of the multiple banks 118-1 to 118-B. In some example implementations, each sense amplifier within the first set of amplifiers 130 is coupled to all of the multiple banks 118-1 to 118-B that are associated with a bank group. In general, the first set of amplifiers 130 passes data between the interconnect 106 and the banks 118-1 to 118-B in accordance with normal memory operations, such as a read operation.

The bank-specific amplifiers 128 are represented by a second set of amplifiers 132 (or a second set of sense amplifiers). Subsets of the second set of amplifiers 132 are respectively coupled between the banks 118-1 to 118-B and the bank-specific usage-based disturbance circuitry 122-1 to 122-B. More specifically, each sense amplifier within the second set of amplifiers 132 is coupled to one of the multiple banks 118-1 to 118-B and one of the bank-specific usage-based disturbance circuitry 122-1 to 122-B. In general, the second set of amplifiers 132 passes data associated with usage-based disturbance from one of the banks 118-1 to 118-B to a one of the bank-specific usage-based disturbance circuitry 122-1 to 122-B that corresponds with the bank 118. With this hybrid architecture 124, the data sense amplifier circuit 120 can have a smaller footprint compared to other designs and support usage-based disturbance mitigation while avoiding conflicts associated with some sequences of commands. The data sense amplifier circuit 120 and the bank-specific usage-based disturbance circuitry 122-1 to 122-B are further described with respect to FIG. 2.

Figure 2:
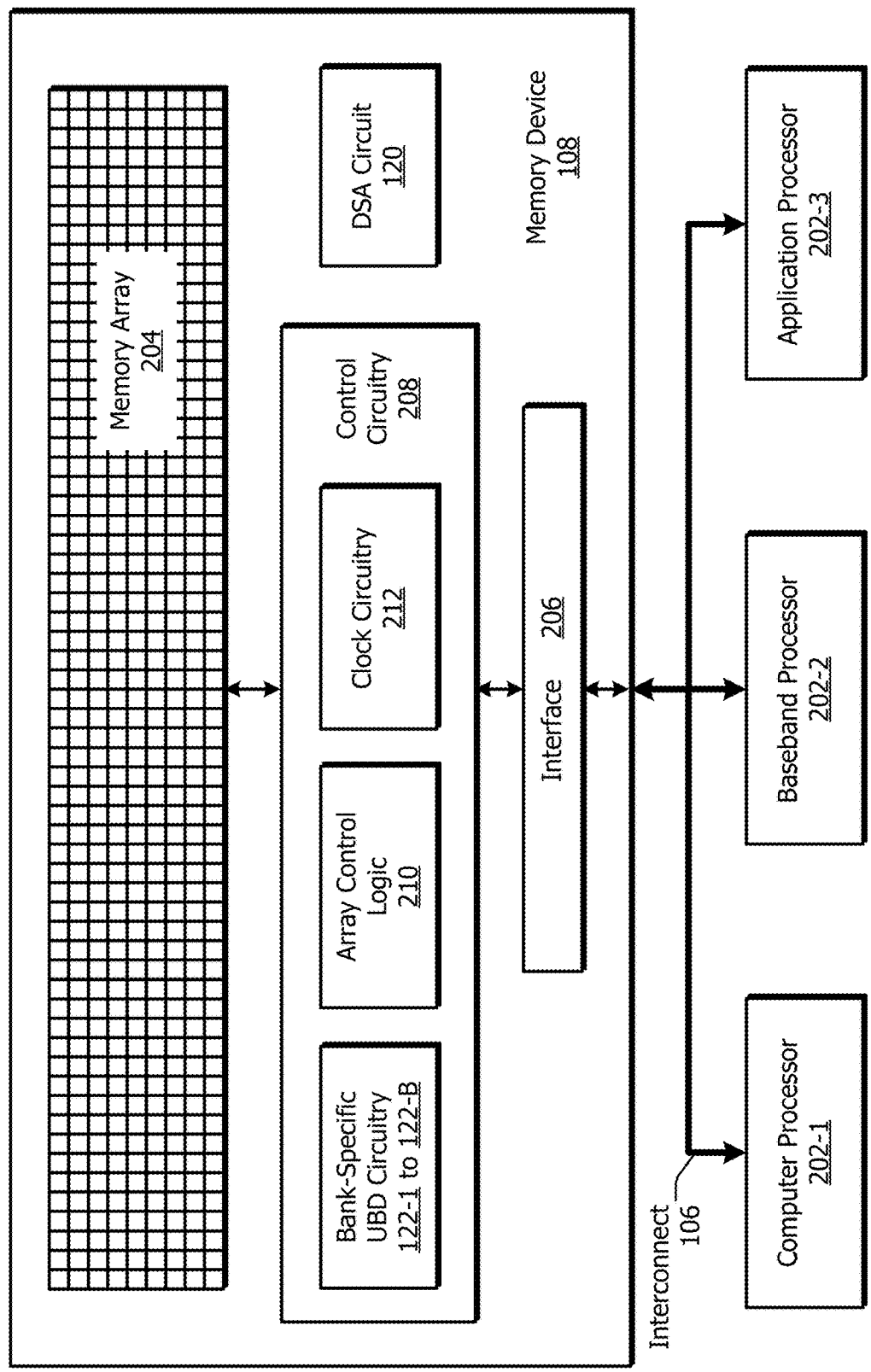
FIG. 2 illustrates an example computing system that can implement aspects of a data sense amplifier circuit with a hybrid architecture within a memory device.

FIG. 2 illustrates an example computing system 200 that can implement aspects of a data sense amplifier circuit 120 with a hybrid architecture 124. In some implementations, the computing system 200 includes at least one memory device 108, at least one interconnect 106, and at least one processor 202. The memory device 108 can include, or be associated with, at least one memory array 204, at least one interface 206, and control circuitry 208 (or periphery circuitry) operatively coupled to the memory array 204. The memory array 204 can include an array of memory cells, including but not limited to memory cells of DRAM, SDRAM, three-dimensional (3D) stacked DRAM, DDR memory, LPDDR SDRAM, and so forth. The memory array 204 and the control circuitry 208 may be components on a single semiconductor die or on separate semiconductor dies. The memory array 204 or the control circuitry 208 may also be distributed across multiple dies. This control circuitry 208 may manage traffic on a bus that is separate from the interconnect 106.

The control circuitry 208 can include various components that the memory device 108 can use to perform various operations. These operations can include communicating with other devices, managing memory performance, performing refresh operations (e.g., self-refresh operations or auto-refresh operations), and performing memory read or write operations. For example, the control circuitry 208 can include at least one instance of array control logic 210 and clock circuitry 212. The array control logic 210 can include circuitry that provides command decoding, address decoding, input/output functions, amplification circuitry, power supply management, power control modes, and other functions. The clock circuitry 212 can synchronize various memory components with one or more external clock signals provided over the interconnect 106, including a command-and-address clock or a data clock. The clock circuitry 212 can also use an internal clock signal to synchronize memory components and may provide timer functionality.

The memory device 108 also includes the data sense amplifier circuit 120 and the bank-specific usage-based disturbance circuitry 122. In some aspects, the data sense amplifier circuit 120 and/or the bank-specific usage-based disturbance circuitry 122 can be considered part of the control circuitry 208. For example, the data sense amplifier circuit 120 can be part of the array control logic 210. As another example, the bank-specific usage-based disturbance circuitry 122-1 to 122-B can represent another part of the control circuitry 208.

The interface 206 can couple the control circuitry 208 or the memory array 204 directly or indirectly to the interconnect 106. In some implementations, the data sense amplifier circuit 120, the bank-specific usage-based disturbance circuitry 122-1 to 122-B, the array control logic 210, and the clock circuitry 212 can be part of a single component (e.g., the control circuitry 208). In other implementations, one or more of the data sense amplifier circuit 120, the bank-specific usage-based disturbance circuitry 122-1 to 122-B, the array control logic 210, or the clock circuitry 212 may be implemented as separate components, which can be provided on a single semiconductor die or disposed across multiple semiconductor dies. These components may individually or jointly couple to the interconnect 106 via the interface 206.

The interconnect 106 may use one or more of a variety of interconnects that communicatively couple together various components and enable commands, addresses, or other information and data to be transferred between two or more components (e.g., between the memory device 108 and the processor 202). Although the interconnect 106 is illustrated with a single line in FIG. 2, the interconnect 106 may include at least one bus, at least one switching fabric, one or more wires or traces that carry voltage or current signals, at least one switch, one or more buffers, and so forth. Further, the interconnect 106 may be separated into at least a command-and-address bus and a data bus.

In some aspects, the memory device 108 may be a "separate" component relative to the host device 104 (of FIG. 1) or any of the processors 202. The separate components can include a printed circuit board, memory card, memory stick, and memory module (e.g., a single in-line memory module (SIMM) or dual in-line memory module (DIMM)). Thus, separate physical components may be located together within the same housing of an electronic device or may be distributed over a server rack, a data center, and so forth. Alternatively, the memory device 108 may be integrated with other physical components, including the host device 104 or the processor 202, by being combined on a printed circuit board or in a single package or a system-on-chip.

As shown in FIG. 2, the processors 202 may include a computer processor 202-1, a baseband processor 202-2, and an application processor 202-3, coupled to the memory device 108 through the interconnect 106. The processors 202 may include or form a part of a central processing unit, graphics processing unit, system-on-chip, application-specific integrated circuit, or field-programmable gate array. In some cases, a single processor can comprise multiple processing resources, each dedicated to different functions (e.g., modem management, applications, graphics, central processing). In some implementations, the baseband processor 202-2 may include or be coupled to a modem (not illustrated in FIG. 2) and referred to as a modem processor. The modem or the baseband processor 202-2 may be coupled wirelessly to a network via, for example, cellular, Wi-Fi®, Bluetooth®, near field, or another technology or protocol for wireless communication.

In some implementations, the processors 202 may be connected directly to the memory device 108 (e.g., via the interconnect 106). In other implementations, one or more of the processors 202 may be indirectly connected to the memory device 108 (e.g., over a network connection or through one or more other devices).

Example Techniques and Hardware

Figure 3:
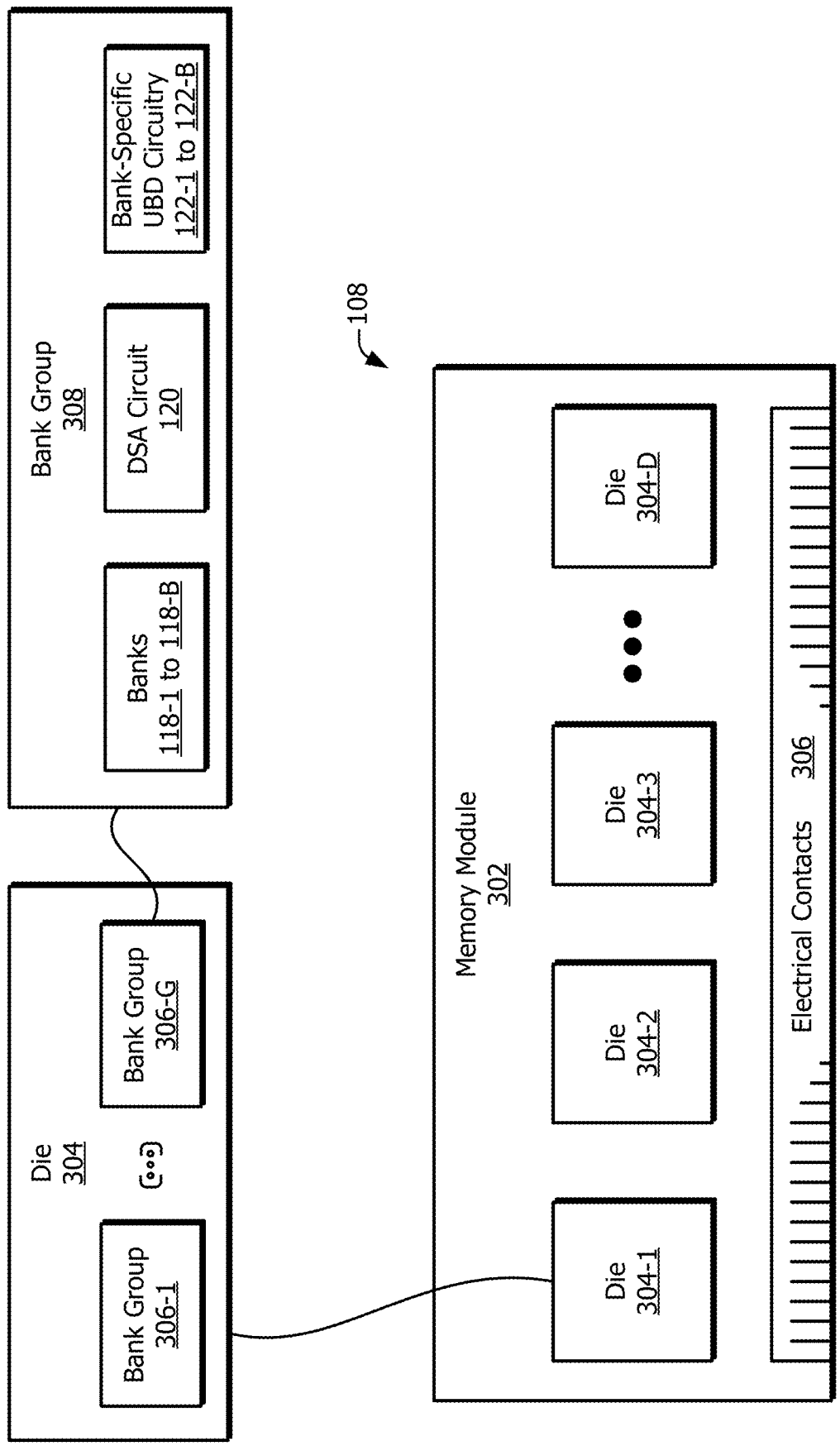
FIG. 3 illustrates an example memory device in which aspects of a data sense amplifier circuit with a hybrid architecture may be implemented.

FIG. 3 illustrates an example memory device 108 in which aspects of a data sense amplifier circuit 120 with a hybrid architecture 124 can be implemented. The memory device 108 includes a memory module 302, which can include multiple dies 304. As illustrated, the memory module 302 includes a first die 304-1, a second die 304-2, a third die 304-3, and a $D^{th}$ die 304-D, with D representing a positive integer. The memory module 302 can be a SIMM or a DIMM. As another example, the memory module 302 can interface with other components via a bus interconnect (e.g., a Peripheral Component Interconnect Express (PCIe®) bus). The memory device 108 illustrated in FIGS. 1 and 2 can correspond, for example, to multiple dies (or dice) 304-1 through 304-D, or a memory module 302 with two or more dies 304. As shown, the memory module 302 can include one or more electrical contacts 306 (e.g., pins) to interface the memory module 302 to other components.

The memory module 302 can be implemented in various manners. For example, the memory module 302 may include a printed circuit board, and the multiple dies 304-1 through 304-D may be mounted or otherwise attached to the printed circuit board. The dies 304 (e.g., memory dies) may be arranged in a line or along two or more dimensions (e.g., forming a grid or array). The dies 304 may have a similar size or may have different sizes. Each die 304 may be similar to another die 304 or different in size, shape, data capacity, or control circuitries. The dies 304 may also be positioned on a single side or on multiple sides of the memory module 302.

One or more of the dies 304-1 to 304-D includes bank groups 308-1 to 308-G, with G representing a positive integer. Each bank group 308 includes at least two banks 118, such as banks 118-1 to 118-B. The bank group 308 also includes the data sense amplifier circuit 120 and the bank-specific usage-based disturbance circuitry 122-1 to 122-B. In general, the quantity of banks 118 within a bank group 308 is equal to the quantity of bank-specific usage-based disturbance circuitry 122. The relationship between the banks 118-1 to 118-B, the data sense amplifier circuit 120, and the bank-specific usage-based disturbance circuitry 122-1 to 122-B is further described with respect to FIG. 4.

Figure 4:
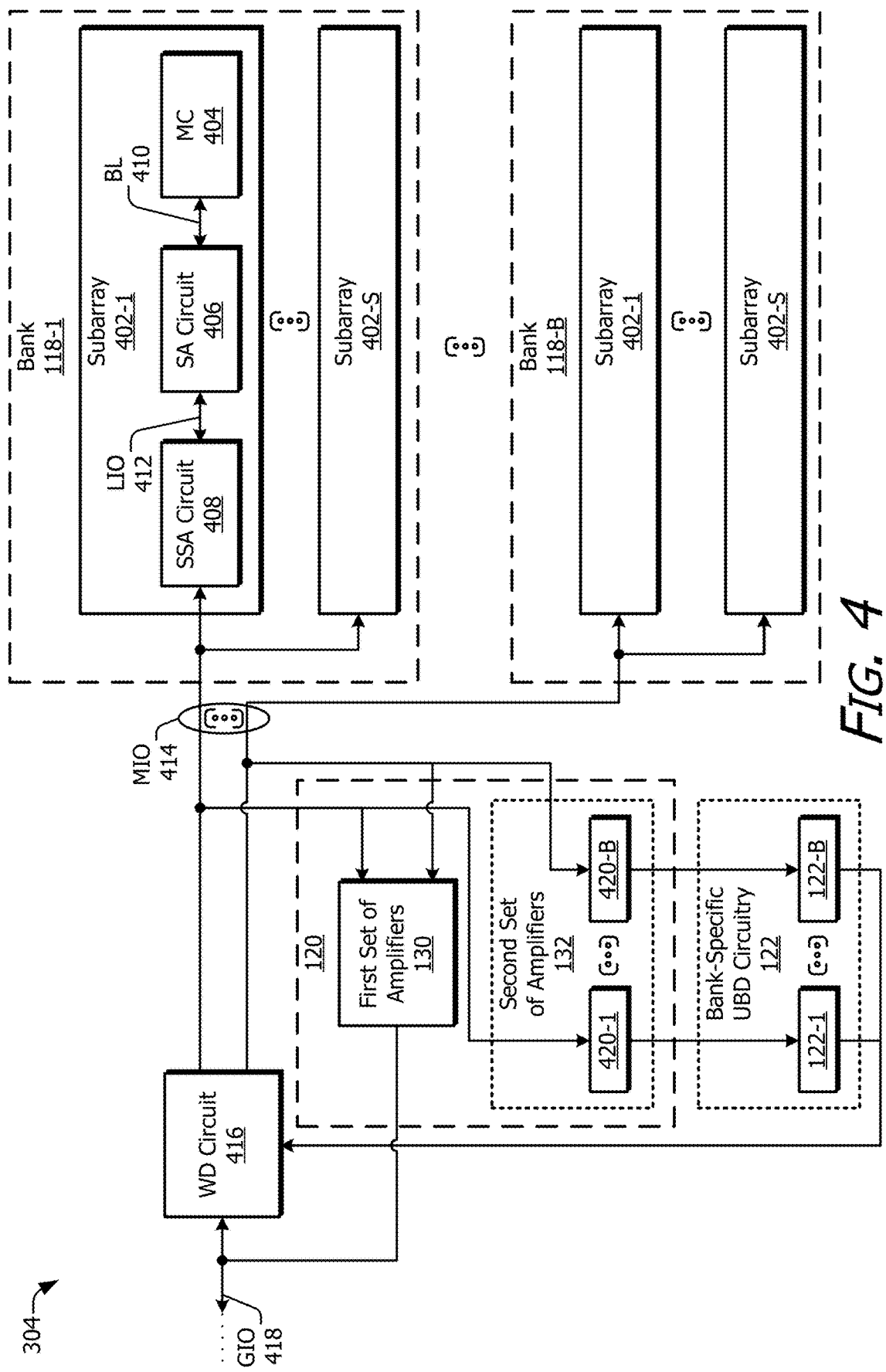
FIG. 4 illustrates example components of a die that includes a data sense amplifier circuit with a hybrid architecture.

FIG. 4 illustrates example components of the die 304. In the depicted configuration, the die 304 includes banks 118-1 to 118-B. Each bank 118 includes multiple subarrays 402-1 to 402-S, where S represents a positive integer. The banks 118-1 and 118-B can include a same quantity of subarrays 402, as shown in FIG. 4, or different quantities of subarrays 402.

Each subarray 402 includes memory cells 404 (MC 404), at least one sense amplifier circuit 406 (SA circuit 406), and optionally at least one subarray sense amplifier circuit 408 (SSA circuit 408). The memory cells 404 associated with each subarray 402 represent a group (or subset) of memory cells of the memory array 204. A portion of these memory cells 404 can store information associated with usage-based disturbance, as further described with respect to FIG. 5. Bit lines 410 (BL 410) couple the memory cells 404 to sense amplifiers within the sense amplifier circuit 406. The bit lines 410 can include differential line pairs.

The sense amplifier circuit 406, which can also be referred to as a sense amplifier array, provides an interface between the bit lines 410 and local input/output (LIO) lines 412 (LIO 412). The local input/output lines 412 can be implemented using differential line pairs. In general, the sense amplifier circuit 406 provides amplification for reading or writing data to the memory cells 404. The local input/output lines 412 couple the sense amplifier circuit 406 to the subarray sense amplifier circuit 408.

The subarray sense amplifier circuit 408, which can also be referred to as a subarray sense amplifier array, provides an interface between the local input/output lines 412 and main input/output (MIO) lines 414 (MIO 414). The main input/output lines 414 can be implemented using single-ended lines or differential line pairs. In general, the subarray amplifier circuit 408 provides amplification for a corresponding subarray 402 during read or write operations. Although not explicitly shown, the subarray 402 can include other components, including buffers, sub-word line drivers, column switches, and so forth.

The subarrays 402-1 to 402-S of each bank 118-1 to 118-B are coupled to the data sense amplifier circuit 120 by the main input/output lines 414 (MIO 414). In particular, the first set of amplifiers 130 is coupled to the subarrays 402-1 to 402-S of the banks 118-1 to 118-B. The first set of amplifiers 130 is also coupled to global input/output (GIO) lines 418 (GIO 418). The global input/output lines 418 can be implemented using single-ended lines and generally couple the first set of amplifiers 130 to the interface 206. The first set of amplifiers 130 provides amplification for any of the banks 118-1 to 118-B during read operations.

The second set of amplifiers 132 includes multiple subsets 420-1 to 420-B. Each subset 420 includes multiple sense amplifiers (or amplifiers) coupled to a bank 118 that corresponds with the subset 420. For example, a first subset 420-1 of the second set of amplifiers 132 is coupled to the subarrays 402-1 to 402-S of the bank 118-1. Also, a Bih subset 420-B of the second set of amplifiers 132 is coupled to the subarrays 402-1 to 402-S of the bank 118-B. Each subset 420-1 to 420-B passes data for one of the corresponding banks 118-1 to 118-B to one of the corresponding bank-specific usage-based disturbance circuitry 122-1 to 122-B during an operation associated with usage-based disturbance mitigation. Each subset 420-1 to 420-B can also provide amplification.

The bank-specific usage-based disturbance circuitry 122-1 to 122-B are respectively coupled between the second set of amplifiers 132 and a write driver circuit 416. The write driver circuit 416 is coupled to the subarrays 402-1 to 402-S of the banks 118-1 to 118-B by the main input/output lines 414. Additionally, the write driver circuit 416 is coupled to the interface 206 by the global input/output lines 418. The write driver circuit 416 can include multiple drivers that are respectively coupled between the main input/output lines 414 and the global input/output lines 418. The bank-specific usage-based disturbance circuitry 122-1 to 122-B can be coupled to a portion of the drivers within the write driver circuit 416. Although illustrated using single lines in FIG. 4, it is to be understood that the bit lines 410, the local input/output lines 412, the main input/output lines 414, and the global input/output lines 418 can represent multiple lines.

During a read operation, the memory cells 404 are activated and data is read from the memory cells 404. The sense amplifier circuit 406 senses and amplifies the data on the bit lines 410 and passes this data to the local input/output lines 412. The subarray sense amplifier circuit 408 amplifies the data on the local input/output lines 412 and passes the data to the main input/output lines 414. The first set of amplifiers 130 amplifies the data on the main input/output lines 414 and passes the data to the global input/output lines 418. The interface 206 passes the data to the memory controller 114.

During a write operation, the write driver circuit 416 receives data from the memory controller 114 via the global input/output lines 418. The write driver circuit 416 passes the data to the main input/output lines 414. The subarray sense amplifier circuit 408 amplifies the data on the main input/output lines 414 and passes the data to the local input/output lines 412. The sense amplifier circuit 406 amplifies the data on the local input/output lines 412 and passes the data to the bit lines 410. The memory cells 404 store the data.

As part of the read and/or write operations associated with a particular bank 118, the bank-specific usage-based disturbance circuitry 122 that corresponds with the bank 118 receives data associated with usage-based disturbance from a portion of the memory cells 404. More specifically, the subset 420 of the second set of amplifiers 132 that corresponds with the bank 118 passes the data associated with usage-based disturbance to the corresponding bank-specific usage-based disturbance circuitry 122. The data associated with usage-based disturbance can include an activation count associated with a row that is activated during the read/write operation and/or parity bits. This bank-specific usage-based disturbance circuitry 122 can provide modified data to the write driver circuit 416 to update the data associated with usage-based disturbance that is stored within the memory cells 404 of the bank 118. For example, the bank-specific usage-based disturbance circuitry 122 can update the activation count associated with the row using a counter circuit and pass this updated activation count to the write driver circuit 416. The write driver circuit 416 writes the updated activation count to the portion of the memory cells 404.

The bank-specific usage-based disturbance circuitry 122 also analyzes this data to monitor for a condition associated with usage-based disturbance. For instance, the bank-specific usage-based disturbance circuitry 122 can use a comparator circuit to detect a condition associated with usage-based disturbance based on the activation count exceeding a threshold. If the condition associated with usage-based disturbance is detected, the bank-specific usage-based disturbance circuitry 122 can generate a control signal that causes the control circuitry 208 to refresh one or more rows within the bank 118 that is associated with the memory operation.

As shown in FIG. 4, the data sense amplifier circuit 120 has the hybrid architecture 124 in which a portion of amplifiers within the data sense amplifier circuit 120 are coupled to multiple banks 118 and another portion of amplifiers within the data sense amplifier circuit 120 are coupled to specific banks 118. For example, each amplifier within the first set of amplifiers 130 is coupled to the banks 118-1 to 118-B. Data passes through the first set of amplifiers 130 for memory operations involving any of the banks 118-1 to 118-B. By using the same amplifiers to service multiple banks 118-1 to 118-B, the die 304 can have a smaller footprint and can be cheaper to manufacture compared to other dies with amplifiers dedicated for each bank 118.

To avoid a potential conflict associated with supporting usage-based disturbance mitigation, the data sense amplifier circuit 120 also includes multiple subsets 420-1 to 420-B of the second set of amplifiers 132, which are coupled to specific banks 118. More specifically, the sense amplifiers within each of the subsets 420-1 to 420-B are coupled to one of the banks 118-1 to 118-B and one of the bank-specific usage-based disturbance circuitry 122-1 to 122-B that correspond with that subset 420. The second set of amplifiers 132 within the data sense amplifier circuit 120 can be dedicated for mitigating usage-based disturbance, as further described with respect to FIG. 5.

Figure 5:
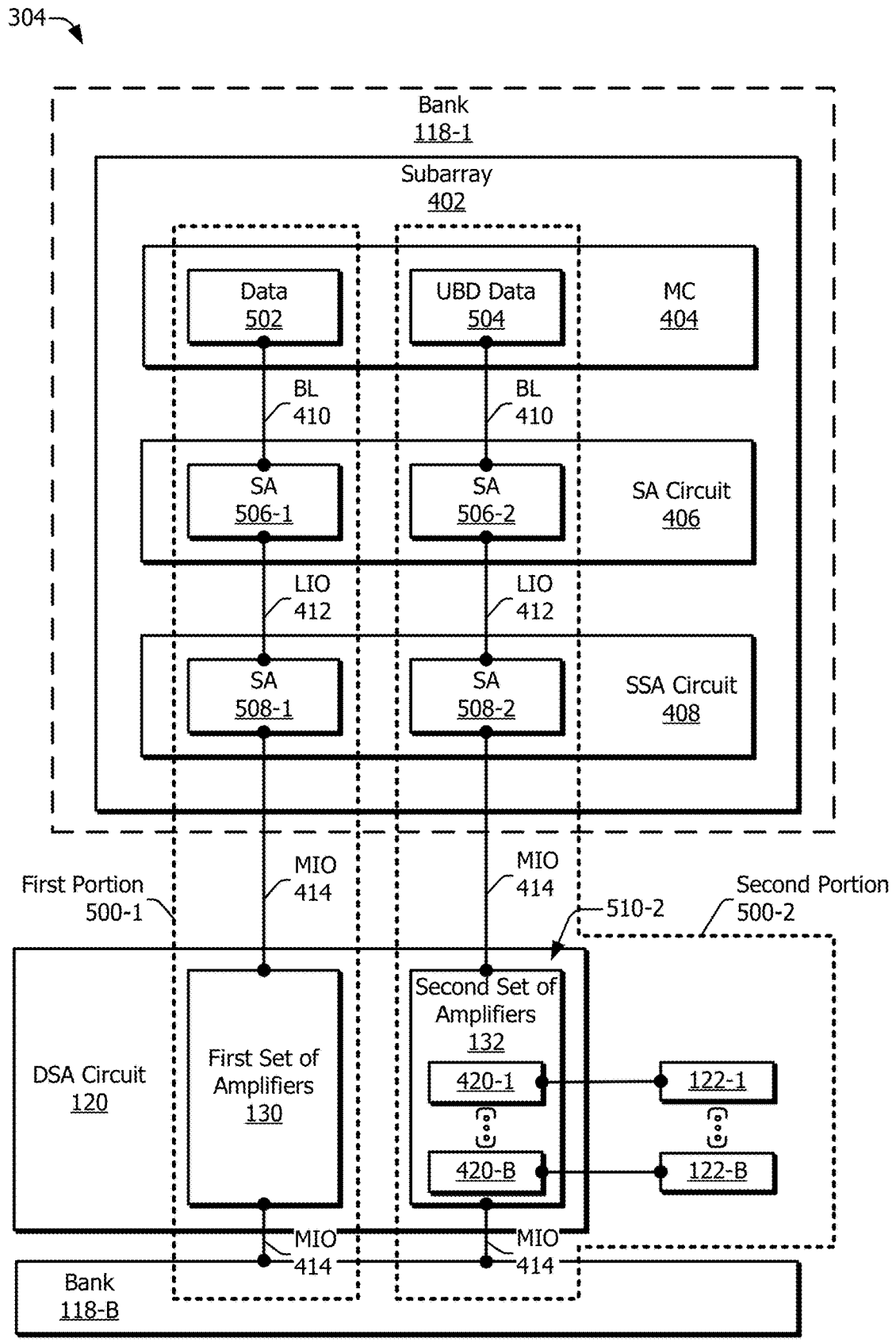
FIG. 5 illustrates portions of a die that support normal memory operations or usage-based disturbance mitigation.

FIG. 5 illustrates portions 500 of a die 304 that support different operations. In the depicted configuration, a first portion 500-1 of the die 304 includes components that support normal memory operations (e.g., a read operation and/or a write operation). A second portion 500-2 of the die 304 includes components that support usage-based disturbance mitigation, which can be performed as part of a read, write, or precharge operation. The subarray 402 shown in FIG. 5 can correspond with any of the subarrays 402-1 to 402-S shown in FIG. 4. In this example, the subarray 402 is associated with the bank 118-1. In general, the subarrays 402 within a bank 118 and the data sense amplifier circuit 120 includes components associated with the first portion 500-1 or the second portion 500-2, as further described below.

The subarray 402 includes the memory cells 404, the sense amplifier circuit 406, and the subarray sense amplifier circuit 408. A first subset of the memory cells 404 store data 502, which can be associated with a read or write operation. A second subset of the memory cells 404 store usage-based disturbance data 504 (UBD data 504). In an example implementation, the usage-based disturbance data 504 includes bits that represent a quantity of activations (e.g., an activation count or active count) since a last refresh for one or more rows of the memory cells 404. The usage-based disturbance data 504 can also include parity bits.

The sense amplifier circuit 406 includes multiple sense amplifiers (SA) 506. A first subset of sense amplifiers (SA 506-1) are coupled to the first subset of memory cells 404 using a first subset of the bit lines 410. A second subset of sense amplifiers (SA 506-2) are coupled to the second subset of memory cells 404 using a second subset of the bit lines 410. The subarray sense amplifier circuit 408 also includes multiple sense amplifiers 508. A first subset of sense amplifiers (SA 508-1) are coupled to the sense amplifiers 506-1 using a first subset of the local input/output lines 412. A second subset of sense amplifiers (SA 508-2) are coupled to the sense amplifiers 506-2 using a second subset of the local input/output lines 412.

The data sense amplifier circuit 120 includes the first set of amplifiers 130 and the second set of amplifiers 132. The first set of amplifiers 130 are coupled to the sense amplifiers 508-1 using a first set of the main input/output lines 414. Although not explicitly shown in FIG. 5, the first set of amplifiers 130 are also coupled to the sense amplifiers 508-1 associated with the other banks 118, such as the bank 118-B. The first set of amplifiers 130 can also be coupled to a data bus using the global input/output lines 418.

The second set of amplifiers 132 includes the multiple subsets 420-1 to 420-B. The subset 420-1 of sense amplifiers is coupled to the sense amplifiers 508-2 using a second set of the main input/output lines 414. The subset 420-1 of sense amplifiers is also coupled to the bank-specific usage-based disturbance circuitry 122-1. Similarly, the subset 420-B of sense amplifiers is coupled to the sense amplifiers 508-2 of the bank 118-B (not explicitly shown) and the bank-specific usage-based disturbance circuitry 122-B.

As shown in FIG. 5, the memory cells 404 that can store the data 502, the sense amplifiers 506-1 and 508-1, and the first set of amplifiers 130 represent the first portion 500-1 of the die 304 that supports normal memory operations. The memory cells 404 that can store the usage-based disturbance data 504, the sense amplifiers 506-2 and 508-2, and the second set of amplifiers 132 represent the second portion 500-2 of the die 304 that supports usage-based disturbance mitigation. Although not shown, the write driver circuit 416 can support both normal memory operations (e.g., a write operation) and usage-based disturbance mitigation, as described above with respect to FIG. 4.

In some situations, the memory device 108 can receive two sequential commands from a memory controller 114 that cause the memory device 108 to utilize different subsets 420-1 to 420-B of the second set of amplifiers 132 during a same time interval. Example commands can include some combinations of a read (RD) command, a read with auto-precharge (RDA) command, a write with auto-precharge (WRA) command, a precharge all banks (PREab) command, a precharge same bank (PREsb) command, or a precharge per bank (PREpb) command. Other commands are also possible, including commands associated with a refresh. In general, these commands can be associated with a same bank or different banks. With the multiple subsets 420-1 to 420-B dedicated for different banks 118-1 to 118-B, the memory device 108 can avoid a usage conflict associated with utilizing the second set of amplifiers 132 to support usage-based disturbance mitigation based on one or both of the commands. As such, the memory device 108 can perform usage-based disturbance mitigation within command timing requirements of the memory controller 116.

The second set of amplifiers 132 dedicated to different banks 118 also provides additional flexibility in positioning the subsets 420 of amplifiers and the bank-specific usage-based disturbance circuitry 122 within the die 304. Example layouts, as further described with respect to FIGS. 6 and 7.

Figure 6:
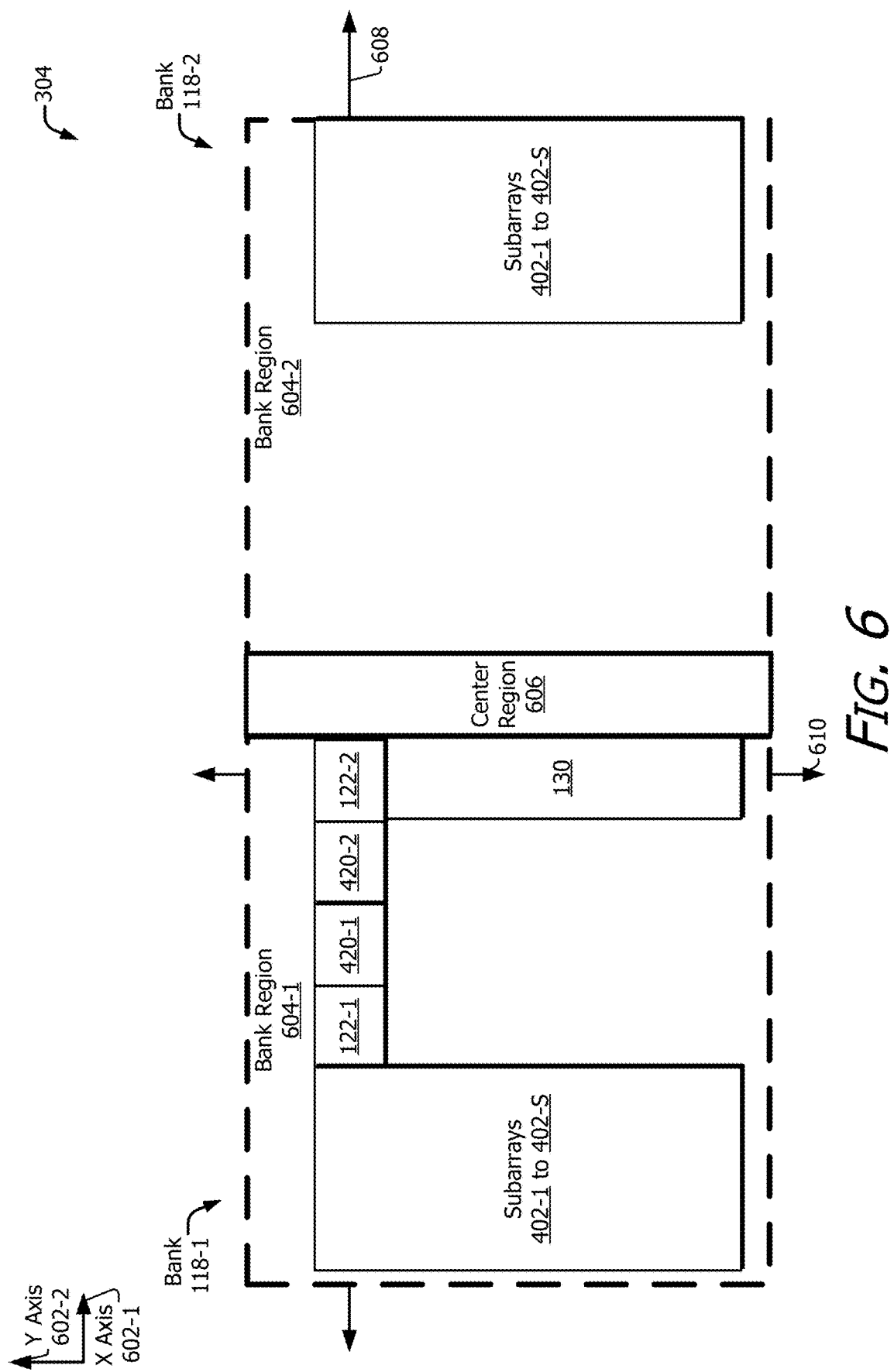
FIG. 6 illustrates an example layout of a die having a data sense amplifier circuit with a hybrid architecture and bank-specific usage-based disturbance mitigation circuitry.

FIG. 6 illustrates an example layout of a die 304 having a data sense amplifier circuit 120 with a hybrid architecture 124 and bank-specific usage-based disturbance circuitry 122. In a top-down view shown in FIG. 6, a surface of the die 304 extends along a first axis 602-1 (X axis 602-1) and a second axis 602-2 (Y axis 602-2), which is substantially perpendicular to the first axis 602-1. A "top" edge and a "bottom" edge of the die 304 are approximately parallel to the first axis 602-1. Also, a "left" edge and a "right" edge of the die 304 are approximately parallel to the second axis 602-2.

A portion of the die 304 that includes two banks (e.g., banks 118-1 and 118-2) is shown in FIG. 6. The die 304 can also include other banks 118, which are not shown in FIG. 6 for simplicity. The portion of the die 304 shown in FIG. 6 includes a first bank region 604-1 associated with a first bank 118-1 and a second bank region 604-2 associated with a second bank 118-2. Components of the subarrays 402-1 to 402-S of the first bank 118-1 are positioned within the first bank region 604-1. Likewise, components of the subarrays 402-1 to 402-S of the second bank 118-2 are positioned within the second bank region 604-2.

The die 304 also includes a center region 606, which is positioned between the bank regions 602-1 and 602-2 along an axis 608, which is substantially parallel to the first axis 602-1. The center region 606 can include components that are shared by the banks 118-1 and 118-2 (e.g., utilized during memory operations associated any of the banks 118-1 to 118-2). In example implementations, the first set of amplifiers 130, the second set of amplifiers 132 (e.g., subsets 420-1 and 420-2), and the bank-shared usage-based disturbance circuitry 122-1 and 122-2 are positioned on one side of the center region 606 within one of the bank regions 604-1 or 604-2. In the depicted layout, the first set of amplifiers 130, the second set of amplifiers 132 (e.g., subsets 420-1 and 420-2), and the bank-shared usage-based disturbance circuitry 122-1 and 122-2 are positioned within the first bank region 604-1. Another implementation is also possible in which the first set of amplifiers 130, the second set of amplifiers 132 (e.g., subsets 420-1 and 420-2), and the bank-shared usage-based disturbance circuitry 122-1 and 122-2 are positioned within the second bank region 604-2.

As shown in FIG. 6, the sense amplifiers within the first set of amplifiers 130 are proximate to the center region 606 and arranged along an axis 610, which is substantially parallel to the second axis 602-2. The subsets 420-1 and 420-2 and the bank-specific usage-based disturbance circuitry 122-1 and 122-2 are generally arranged along the axis 608. The amplifiers within the subsets 420-1 and 420-2 can be positioned along respective axes that are substantially parallel to the axis 610.

In general, the subset 402-1 and 402-2 and the bank-specific usage-based disturbance circuitry 122-1 and 122-2 are positioned proximate to the corresponding bank 118's subarrays 402-1 to 402-S. This causes the subarrays 402-1 to 402-S of the bank 118-1 to be closer to the subset 420-1 and the bank-specific usage-based disturbance circuitry 122-1 compared to the subset 402-2 and the bank-specific usage-based disturbance circuitry 122-2. Likewise, the subarrays 402-1 to 402-S of the second bank 118-2 are closer to the subset 420-2 and the bank-specific usage-based disturbance circuitry 122-2 compared to the subset 402-1 and the bank-specific usage-based disturbance circuitry 122-1. In this example, the subsets 420-1 and 420-2 are positioned proximate to each other, and the bank-specific usage-based disturbance circuitry 122-1 and 122-2 are positioned on opposite sides of the subsets 420-1 and 420-2. Although not explicitly shown, the write driver circuit 416 can be positioned between subsets 402-1 and 402-2 along the axis 608.

With the layout shown in FIG. 6, the main input/output lines 414 associated with the second bank 118-2 pass through the center region 606 to couple the first set of amplifiers 130 and the subset 420-2 of sense amplifiers to the subarrays 402-1 to 402-S of the second bank 118-2. Alternatively, the subsets 420-1 and 420-2 and the bank-specific usage-based disturbance circuitry 122-1 and 122-2 associated with different banks 118 can be positioned within different bank regions 604, as further described with respect to FIG. 7.

Figure 7:
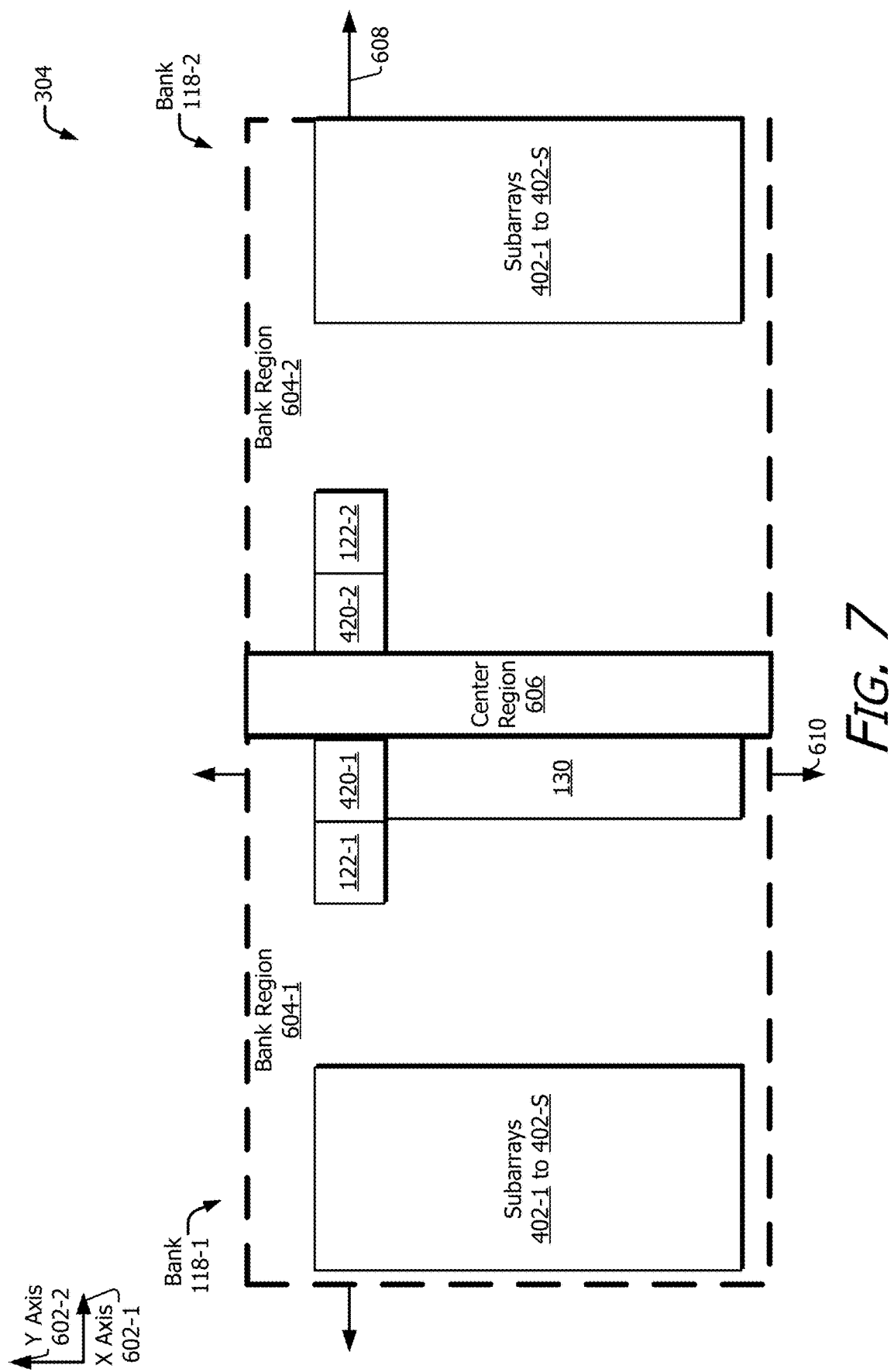
FIG. 7 illustrates another example layout of a data sense amplifier circuit with a hybrid architecture and bank-specific usage-based disturbance mitigation circuitry.

FIG. 7 illustrates another example layout of a die 304 having a data sense amplifier circuit 120 with a hybrid architecture 124 and bank-specific usage-based disturbance mitigation circuitry 122. In contrast to the layout shown in FIG. 7, the subsets 420-1 and 4202 and the bank-specific usage-based disturbance circuitry 122-1 and 122-2 are distributed on different sides of the center region 606. In particular, the subset 420-1 and the bank-specific usage-based disturbance circuitry 122-1 associated with the first bank 118-1 are positioned within the first bank region 604-1, which is shown to be on a "left" side of the center region 606. Also, the subset 420-2 and the bank-specific usage-based disturbance circuitry 122-2 associated with the second bank 118-2 are positioned within the second bank region 604-2, which is shown to be on a "right" side of the center region 606.

In this example, the subsets 420-1 and 420-2 are positioned closer to the center region 606 compared to the bank-specific usage-based disturbance circuitry 122-1 and 122-2. The first set of amplifiers 130 can be positioned within the first bank region 604-1, as shown in FIG. 7, or the second bank region 604-2. Although not explicitly shown, the drivers associated with the write driver circuit 416 that are coupled to the bank-specific usage-based disturbance circuitry 122-1 can be positioned within the bank region 604-1. In contrast, the drivers associated with the write driver circuit 416 that are coupled to the bank-specific usage-based disturbance circuitry 122-2 can be positioned within the bank region 604-2.

Example Methods

Figure 8:
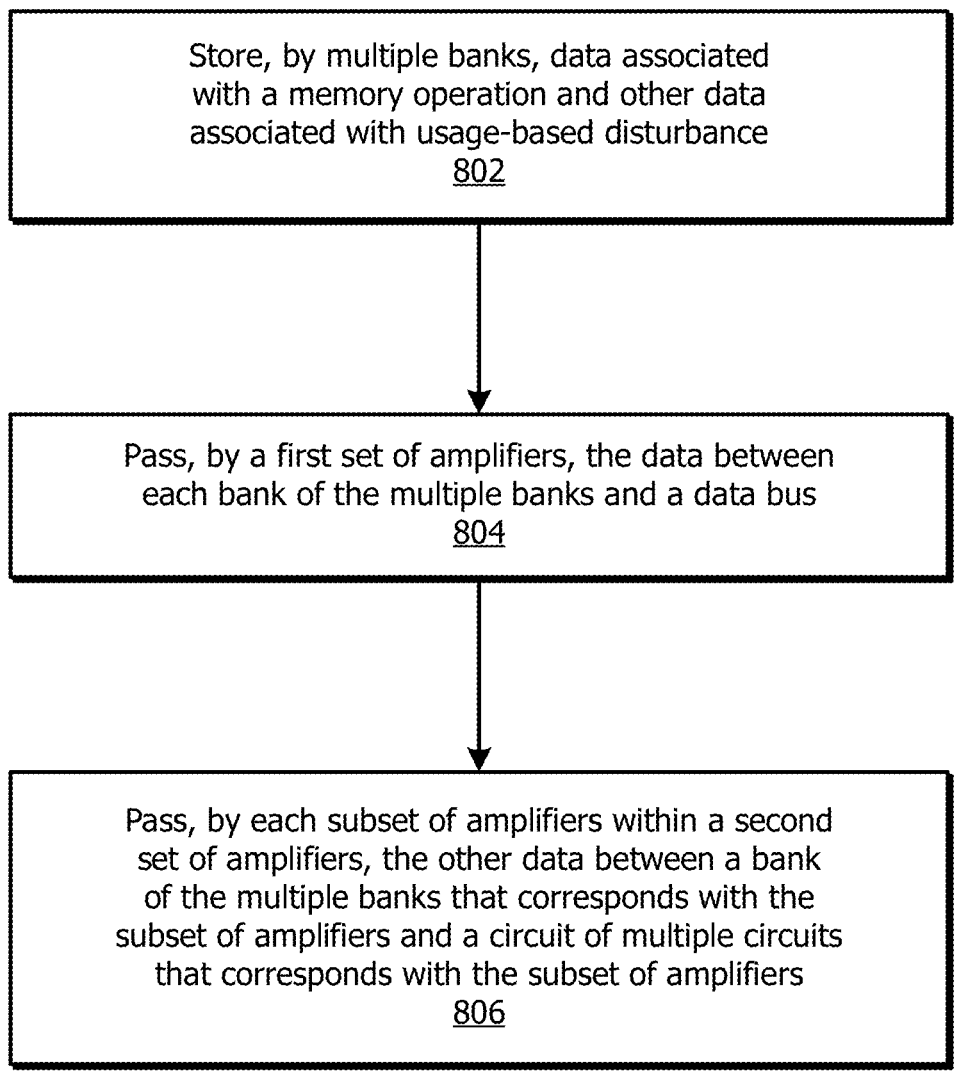
FIG. 8 illustrates an example method performed by a memory device for implementing aspects of a data sense amplifier circuit with a hybrid architecture.
Figure 9:
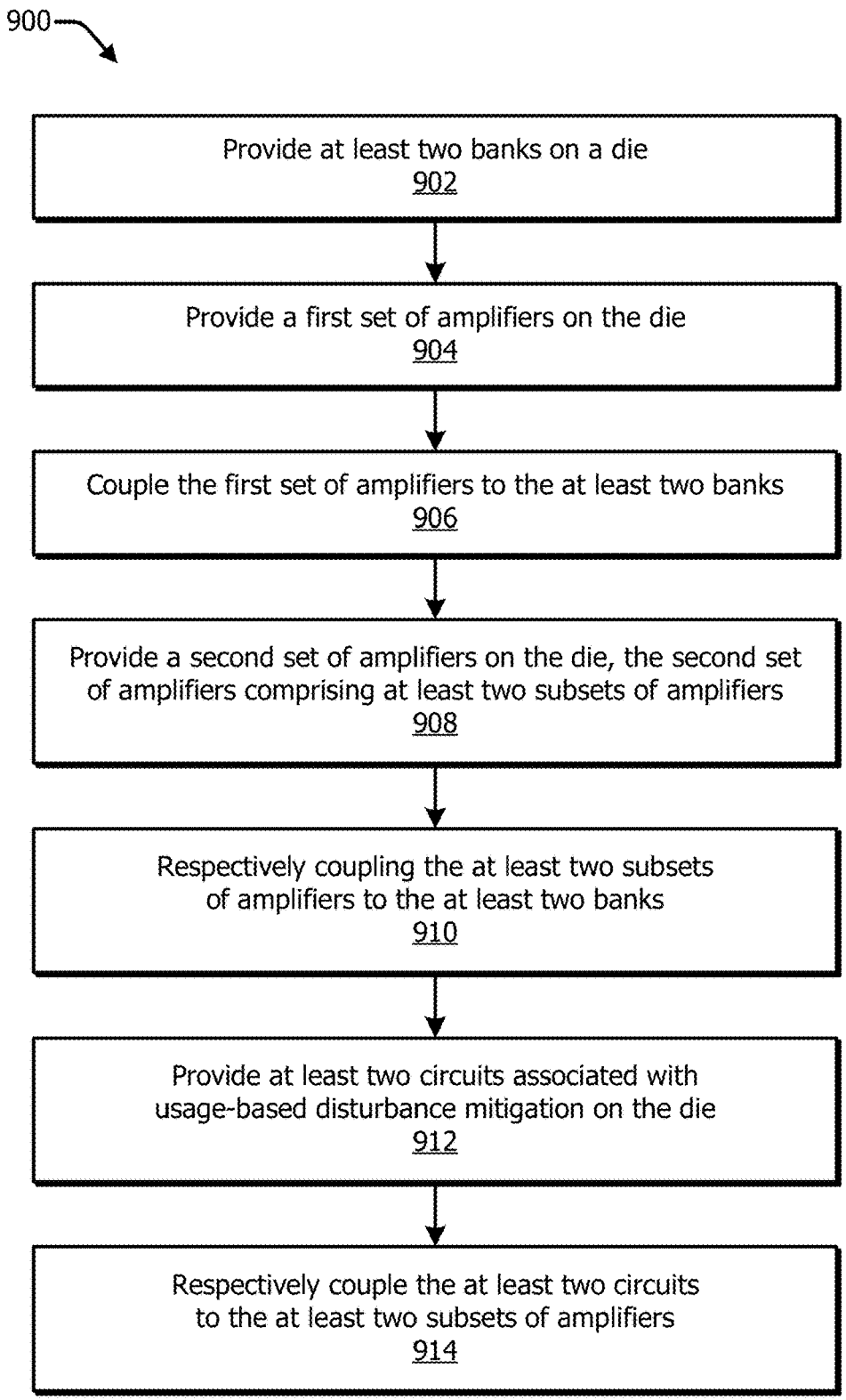
FIG. 9 illustrates an example method for manufacturing a memory device having a data sense amplifier circuit with a hybrid architecture.

This section describes example methods for implementing aspects of a data sense amplifier circuit with a hybrid architecture with reference to the flow diagrams of FIGS. 8 and 9. These descriptions may also refer to components, entities, and other aspects depicted in FIGS. 1 to 7 by way of example only. The described methods are not necessarily limited to performance by one entity or multiple entities operating on one device.

FIG. 8 illustrates a flow diagram 800, which includes operations 802 through 806. In aspects, operations of the method 800 are implemented by a memory device 108 as described with reference to FIG. 1. At 802, data associated with a memory operation and other data associated with usage-based disturbance are stored by multiple banks. For example, the memory device 108 stores the data 502 and the usage-based disturbance data 504 within the banks 118-1 to 118-B, as shown in FIG. 5. The usage-based disturbance data 504 can include activation counts associated with respective rows within the bank 118 and/or parity bits.

At 804, the data is passed by a first set of amplifiers between each bank of the multiple banks and a data bus. For example, the first set of amplifiers 130 pass the data 502 between each bank 118 of the multiple banks 118-1 to 118-B and the data bus, which can be part of the interconnect 106. For example, the first set of amplifiers 130 pass the data 502 from the bank 118-1 to the data bus during a first time interval associated with a first read operation. The first set of amplifiers 130 also pass the data 502 from the bank 118-B to the data bus during a second time interval associated with a second read operation. In some implementations, the first set of amplifiers 130 also amplify the data 502. The first set of amplifiers 130 is coupled to the banks 118-1 to 118-B by the main input/output lines 414 and is coupled to the data bus by the global input/output lines 418, as shown in FIG. 4.

At 806, the other data is passed by each subset of amplifiers within a second set of amplifiers between a bank of the multiple banks that corresponds with the subset of amplifiers and a circuit of multiple circuits that corresponds with the subset of amplifiers 806. For example, the subset 420-1 passes the usage-based disturbance data 504 from the bank 118-1 to the bank-specific usage-based disturbance circuitry 122-1, as shown in FIG. 5. Likewise, the subset 420-B passes the usage-based disturbance data 504 from the bank 118-B to the bank-specific usage-based disturbance circuitry 122-B. As shown in FIG. 4, the subsets 420-1 to 420-B are coupled to subarrays 420 of different banks 118-1 to 118-B.

FIG. 9 illustrates a flow diagram 900, which includes operation 902 to 914. In aspects, operations of the method 900 are associated with manufacturing a memory device 108 described with reference to FIGS. 1 to 7. At 902, at least two banks are provided on a die. For example, the manufacturing process provides at least two banks 118-1 to 118-B on the die 304. The two banks 118-1 to 118-B are associated with a same bank group 308, as shown in FIG. 3. Components of the banks 118-1 to 118-B can be positioned within different bank regions 604. For example, components associated with the subarrays 402 of the bank 118-1 can be positioned within the first bank region 604-1, as shown in FIGS. 6 and 7. Likewise, components associated with the subarrays 402 of the bank 118-2 can be positioned within the second bank region 604-2, as shown in FIGS. 6 and 7.

At 904, a first set of amplifiers is provided on the die. For example, the manufacturing process provides the first set of amplifiers 130 on the die 304. The first set of amplifiers 130 can be positioned within any of the bank regions 604. In the example layouts shown in FIGS. 6 and 7, the first set of amplifiers 132 is positioned within the first bank region 604-1.

At 906, the first set of amplifiers are coupled to the at least two banks. For example, the manufacturing process couples the first set of amplifiers 130 to the at least two banks 118-1 to 118-B. More specifically, each amplifier within the first set of amplifiers 130 is coupled to the at least two banks 118-1 to 118-B by a portion of the main input/output lines 414, as shown in FIG. 4. In this manner, the amplifiers within the first set of amplifiers 130 can be referred to as bank-shared amplifiers 126.

At 908, a second set of amplifiers is provided on the die. The second set of amplifiers comprise at least two subsets of amplifiers. For example, the manufacturing process provides the second set of amplifiers 132 on the die 304. The second set of amplifiers 132 includes at least two subsets 420-1 to 420-B, as shown in FIG. 4. The subsets 420-1 to 420-B can be positioned within a same bank region 604, as shown in FIG. 6, or different bank regions 604, as shown in FIG. 7.

At 910, the at least two subsets of amplifiers are respectively coupled to the at least two banks. For example, the manufacturing processes couples the at least two subsets 420-1 to 420-B to the at least two banks 118-1 to 118-B, respectively, as shown in FIG. 4. Another portion of the main input/output lines 414 couple the subsets 420-1 to 420-B to the banks 118-1 to 118-B. In this manner, the amplifiers within the second set of amplifiers 132 can be referred to as bank-specific amplifiers 128.

At 912, at least two circuits associated with usage-based disturbance mitigation are provided on the die. For example, the manufacturing process provides at least two bank-specific usage-based disturbance circuitry 122-1 to 122-B on the die 304. The bank-specific usage-based disturbance circuitry 122-1 to 122-B can be positioned within a same bank region 604, as shown in FIG. 6, or different bank regions 604, as shown in FIG. 7. Example implementations of the bank-specific usage-based disturbance circuitry 122 can include a counter circuit, a comparator circuit, a queue, and/or an error-correction-code circuit.

At 914, the at least two circuits are respectively coupled to the at least two subsets of amplifiers. For example, the manufacturing process couples the bank-specific usage-based disturbance circuitry 122-1 to 122-B to the at least two subsets 420-1 to 420-B, respectively, as shown in FIGS. 4 and 5. The bank-specific usage-based disturbance circuitry 122-1 to 122-B can also be coupled to a portion of the drivers within the write driver circuit 416, as shown in FIG. 4.

For the figures described above, the orders in which operations are shown and/or described are not intended to be construed as a limitation. Any number or combination of the described process operations can be combined or rearranged in any order to implement a given method or an alternative method. Operations may also be omitted from or added to the described methods. Further, described operations can be implemented in fully or partially overlapping manners.

Aspects of these methods may be implemented in, for example, hardware (e.g., fixed-logic circuitry or a processor in conjunction with a memory), firmware, software, or some combination thereof. The methods may be realized using one or more of the apparatuses or components shown in FIGS. 1 to 7, the components of which may be further divided, combined, rearranged, and so on. The devices and components of these figures generally represent hardware, such as electronic devices, packaged modules, IC chips, or circuits; firmware or the actions thereof; software; or a combination thereof. Thus, these figures illustrate some of the many possible systems or apparatuses capable of implementing the described methods.

Computer-readable media includes both non-transitory computer storage media and communication media including any medium that facilitates transfer of a computer program (e.g., an application) or data from one entity to another. Non-transitory computer storage media can be any available medium accessible by a computer, such as RAM, ROM, Flash, EEPROM, optical media, and magnetic media.

In the following, various examples for implementing aspects of a data sense amplifier circuitry with a hybrid architecture are described:

Example 1: An apparatus comprising:
  a memory device comprising:
    multiple banks;
    a first set of amplifiers, each amplifier of the first set of amplifiers coupled to the multiple banks, the first set of amplifiers configured to be coupled to a data bus;
    a second set of amplifiers comprising multiple subsets of amplifiers respectively coupled to the multiple banks; and
    multiple circuits respectively coupled to the multiple subsets of amplifiers, each circuit of the multiple circuits comprising at least a counter circuit.

Example 2: The apparatus of example 1 or any other example, wherein:
  the multiple banks comprise a first bank and a second bank;
  each amplifier of the first set of amplifiers is coupled to the first bank and the second bank; and
  the multiple subsets of amplifiers comprise:
    a first subset of amplifiers coupled to the first bank; and
    a second subset of amplifiers coupled to the second bank.

Example 3: The apparatus of example 2 or any other example, wherein:
  the multiple circuits comprise:
    a first circuit configured to mitigate usage-based disturbance within the first bank using the counter circuit; and
    a second circuit configured to mitigate usage-based disturbance within the second bank using the counter circuit;
  the first subset of amplifiers is coupled to the first circuit; and
  the second subset of amplifiers is coupled to the second circuit.

Example 4: The apparatus of example 1 or any other example, further comprising:
  a die comprising:
    a first region comprising components associated with a first bank of the multiple banks; and a second region comprising components associated with a second bank of the multiple banks,
wherein the second set of amplifiers and the multiple circuits are positioned within the first region or the second region.

Example 5: The apparatus of example 4 or any other example, wherein the first set of amplifiers is positioned within a same region as the second set of amplifiers and the multiple circuits.

Example 6: The apparatus of example 4 or any other example, wherein:
the multiple subsets of amplifiers comprise a first subset of amplifiers and a second subset of amplifiers;
the multiple circuits comprise a first circuit and a second circuit;
the first subset of amplifiers and the first circuit are associated with the first bank;
the second subset of amplifiers and the second circuit are associated with the second bank; and
the first circuit, the first subset of amplifiers, the second subset of amplifiers, and the second circuit are arranged along an axis that passes through the first region and the second region.

Example 7: The apparatus of example 6 or any other example, wherein:
the first circuit and the first subset of amplifiers are adjacent to each other along the axis; and
the second circuit and the second subset of amplifiers are adjacent to each other along the axis.

Example 8: The apparatus of example 1 or any other example, further comprising:
a die comprising:
a first region comprising components associated with a first bank of the multiple banks; and
a second region comprising components associated with a second bank of the multiple banks, wherein:
the multiple subsets of amplifiers comprise:
a first subset of amplifiers positioned within the first region; and
a second subset of amplifiers positioned within the second region; and
the multiple circuits comprise:
a first circuit positioned within the first region and coupled to the first subset of amplifiers; and
a second circuit positioned within the second region and coupled to the second subset of amplifiers.

Example 9: A method comprising:
storing, by multiple banks, data associated with a memory operation and other data associated with usage-based disturbance;
passing, by a first set of amplifiers, the data between each bank of the multiple banks and a data bus; and
passing, by each subset of amplifiers within a second set of amplifiers, the other data between a bank of the multiple banks that corresponds with the subset of amplifiers and a circuit of multiple circuits that corresponds with the subset of amplifiers.

Example 10: The method of example 9 or any other example, further comprising:
performing, by each circuit of the multiple circuits and based on the other data, usage-based disturbance mitigation for the bank of the multiple banks that corresponds with the circuit.

Example 11: The method of example 10 or any other example, wherein:
the storing of the other data comprises storing, by the bank, an activation count associated with a row of the bank; and
the performing the usage-based disturbance mitigation comprises updating the activation count associated with the row of the bank.

Example 12: The method of example 9 or any other example, further comprising:
reading the data from a first bank of the multiple banks during a first time interval; and
reading the data from a second bank of the multiple banks during a second time interval, wherein:
the passing the data comprises:
passing, by the first set of amplifiers, the data from the first bank to the data bus during the first time interval; and
passing, by the first set of amplifiers, the data from the second bank to the data bus during the second time interval.

Example 13: The method of example 12 or any other example, further comprising:
reading the other data from a first bank of the multiple banks during the first time interval; and
reading the other data from a second bank of the multiple banks during the second time interval, wherein:
the subsets of amplifiers within the second set of amplifiers comprises a first subset of amplifiers and a second subset of amplifiers; and
the passing the other data comprises:
passing, by the first subset of amplifiers, the other data from the first bank to a first circuit of the multiple circuits; and
passing, by the second subset of amplifiers, the data from the second bank to the data bus during the second time interval.

Example 14: An apparatus comprising:
a memory device comprising:
at least two banks;
at least two circuits respectively configured to mitigate usage-based disturbance within the at least two banks;
a first set of amplifiers coupled to the at least two banks and configured to pass data between each bank of the at least two banks and a data bus; and
a second set of amplifiers comprising at least two subsets of amplifiers respectively configured to pass other data from the at least two banks to the at least two circuits.

Example 15: The apparatus of example 14 or any other example, wherein the memory device is configured to perform memory operations that utilize the first set of amplifiers and are associated with different banks of the at least two banks.

Example 16: The apparatus of example 15 or any other example, wherein the memory device is configured to:
receive read commands from a memory controller; and
perform the memory operations based on the read commands.

Example 17: The apparatus of example 14 or any other example, wherein the memory device is configured to:
receive two sequential commands from a memory controller; and
utilize different subsets of the at least two subsets of amplifiers during a same time interval based on the two sequential commands.

Example 18: The apparatus of example 17 or any other example, wherein the two sequential commands comprise any combination of the following commands:
- a read command;
- a read with auto-precharge command;
- a write with auto-precharge command;
- a precharge all banks command;
- a precharge same bank command; or
- a precharge per bank command.

Example 19: The apparatus of example 14 or any other example, further comprising:
- a die comprising:
  - a first region comprising components associated with a first bank of the at least two banks; and
  - a second region comprising components associated with a second bank of the at least two banks,
- wherein the first set of amplifiers, the second set of amplifiers, and the at least two circuits are positioned within the first region or the second region.

Example 20: The apparatus of example 14 or any other example, further comprising:
- a die comprising:
  - a first region comprising components associated with a first bank of the multiple banks;
  - a second region comprising components associated with a second bank of the multiple banks, wherein:
- the first set of amplifiers is positioned within the first region or the second region;
- the at least two subsets of amplifiers comprise:
  - a first subset of amplifiers positioned within the first region; and
  - a second subset of amplifiers positioned within the second region; and
- the multiple circuits comprise:
  - a first circuit positioned within the first region and coupled to the first subset of amplifiers; and
  - a second circuit positioned within the second region and coupled to the second subset of amplifiers.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, as used herein, a phrase referring to "at least one of" a list of items refers to any combination of those items, including single members. For instance, "at least one of a, b, or c" can cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c, or any other ordering of a, b, and c). Further, items represented in the accompanying figures and terms discussed herein may be indicative of one or more items or terms, and thus reference may be made interchangeably to single or plural forms of the items and terms in this written description.

CONCLUSION

Although aspects of implementing aspects of a data sense amplifier circuit with a hybrid architecture have been described in language specific to certain features and/or methods, the subject of the appended claims is not necessarily limited to the specific features or methods described. Rather, the specific features and methods are disclosed as a variety of example implementations of implementing aspects of a data sense amplifier circuit with a hybrid architecture.

What is claimed is:

1. An apparatus comprising:
a memory device comprising:
   multiple banks;
   a first set of amplifiers, each amplifier of the first set of amplifiers coupled to at least two of the multiple banks, the first set of amplifiers configured to be coupled to a data bus;
   a second set of amplifiers comprising multiple subsets of amplifiers, each subset coupled to a respective different bank of the multiple banks; and
   multiple circuits, each circuit of the multiple circuits coupled to a respective subset of the multiple subsets of amplifiers, and each circuit of the multiple circuits comprising at least a counter circuit.

2. The apparatus of claim 1, wherein:
the multiple banks comprise a first bank and a second bank;
each amplifier of the first set of amplifiers is coupled to the first bank and the second bank; and
the multiple subsets of amplifiers comprise:
   a first subset of amplifiers coupled to the first bank; and
   a second subset of amplifiers coupled to the second bank.

3. The apparatus of claim 2, wherein:
the multiple circuits comprise:
   a first circuit configured to mitigate usage-based disturbance within the first bank using the counter circuit; and
   a second circuit configured to mitigate usage-based disturbance within the second bank using the counter circuit;
the first subset of amplifiers is coupled to the first circuit; and
the second subset of amplifiers is coupled to the second circuit.

4. The apparatus of claim 1, further comprising:
a die comprising:
   a first region comprising components associated with a first bank of the multiple banks; and
   a second region comprising components associated with a second bank of the multiple banks,
wherein the second set of amplifiers and the multiple circuits are positioned within the first region or the second region.

5. The apparatus of claim 4, wherein the first set of amplifiers is positioned within a same region as the second set of amplifiers and the multiple circuits.

6. The apparatus of claim 4, wherein:
the multiple subsets of amplifiers comprise a first subset of amplifiers and a second subset of amplifiers;
the multiple circuits comprise a first circuit and a second circuit;
the first subset of amplifiers and the first circuit are associated with the first bank;
the second subset of amplifiers and the second circuit are associated with the second bank; and
the first circuit, the first subset of amplifiers, the second subset of amplifiers, and the second circuit are arranged along an axis that passes through the first region and the second region.

7. The apparatus of claim 6, wherein:
the first circuit and the first subset of amplifiers are adjacent to each other along the axis; and
the second circuit and the second subset of amplifiers are adjacent to each other along the axis.

8. The apparatus of claim 1, further comprising:
a die comprising:
- a first region comprising components associated with a first bank of the multiple banks; and
- a second region comprising components associated with a second bank of the multiple banks, wherein:

the multiple subsets of amplifiers comprise:
- a first subset of amplifiers positioned within the first region; and
- a second subset of amplifiers positioned within the second region; and the multiple circuits comprise:
- a first circuit positioned within the first region and coupled to the first subset of amplifiers; and
- a second circuit positioned within the second region and coupled to the second subset of amplifiers.

9. A method comprising:
storing, by multiple banks, data associated with memory operations and other data associated with usage-based disturbance;
passing, by a first set of amplifiers, the data between each bank of the multiple banks and a data bus; and
passing, by multiple subsets of amplifiers within a second set of amplifiers, the other data from each bank of the multiple banks to multiple circuits, wherein each subset of the multiple subsets of amplifiers is coupled to a respective different bank of the multiple banks.

10. The method of claim 9, further comprising:
performing, by each circuit of the multiple circuits and based on the other data from a respective bank, usage-based disturbance mitigation for the respective bank of the multiple banks.

11. The method of claim 10, wherein:
the storing of the other data comprises storing, by the respective bank, an activation count associated with a row of the respective bank; and
the performing the usage-based disturbance mitigation comprises updating the activation count associated with the row of the respective bank.

12. The method of claim 9, further comprising:
reading the data from a first bank of the multiple banks during a first time interval; and
reading the data from a second bank of the multiple banks during a second time interval, wherein:
the passing the data comprises:
- passing, by the first set of amplifiers, the data from the first bank to the data bus during the first time interval; and
- passing, by the first set of amplifiers, the data from the second bank to the data bus during the second time interval.

13. The method of claim 12, further comprising:
reading the other data from a first bank of the multiple banks during the first time interval; and
reading the other data from a second bank of the multiple banks during the second time interval, wherein:
the subsets of amplifiers within the second set of amplifiers comprises a first subset of amplifiers and a second subset of amplifiers; and
the passing the other data comprises:
- passing, by the first subset of amplifiers, the other data from the first bank to a first circuit of the multiple circuits; and
- passing, by the second subset of amplifiers, the data from the second bank to the data bus during the second time interval.

14. An apparatus comprising:
a memory device comprising:
- at least two banks;
- at least two circuits, each configured to mitigate usage-based disturbance within a respective bank of the at least two banks;
- a first set of amplifiers, each amplifier within the first set of amplifiers coupled to each bank of the at least two banks, and the first set of amplifiers configured to pass data between each bank of the at least two banks and a data bus; and
- a second set of amplifiers comprising at least two subsets of amplifiers, each subset configured to be dedicated to passing other data from a different one of the at least two banks to the at least two circuits.

15. The apparatus of claim 14, wherein the memory device is configured to perform memory operations that utilize the first set of amplifiers and are associated with different banks of the at least two banks.

16. The apparatus of claim 15, wherein the memory device is configured to:
receive read commands from a memory controller; and
perform the memory operations based on the read commands.

17. The apparatus of claim 14, wherein the memory device is configured to:
receive two sequential commands from a memory controller; and
utilize different subsets of the at least two subsets of amplifiers during a same time interval based on the two sequential commands.

18. The apparatus of claim 17, wherein the two sequential commands comprise any combination of the following commands:
- a read command;
- a read with auto-precharge command;
- a write with auto-precharge command;
- a precharge all banks command;
- a precharge same bank command; or
- a precharge per bank command.

19. The apparatus of claim 14, further comprising:
a die comprising:
- a first region comprising components associated with a first bank of the at least two banks; and
- a second region comprising components associated with a second bank of the at least two banks,
wherein the first set of amplifiers, the second set of amplifiers, and the at least two circuits are positioned within the first region or the second region.

20. The apparatus of claim 14, further comprising:
a die comprising:
- a first region comprising components associated with a first bank of the multiple banks;
- a second region comprising components associated with a second bank of the multiple banks, wherein:

the first set of amplifiers is positioned within the first region or the second region;
the at least two subsets of amplifiers comprise:
- a first subset of amplifiers positioned within the first region; and
- a second subset of amplifiers positioned within the second region; and the multiple circuits comprise:
- a first circuit positioned within the first region and coupled to the first subset of amplifiers; and a second circuit positioned within the second region and coupled to the second subset of amplifiers.

* * * * *